Jan. 16, 1951     J. A. S. ROY ET AL     2,538,043
SUPPORT
Filed Feb. 21, 1946
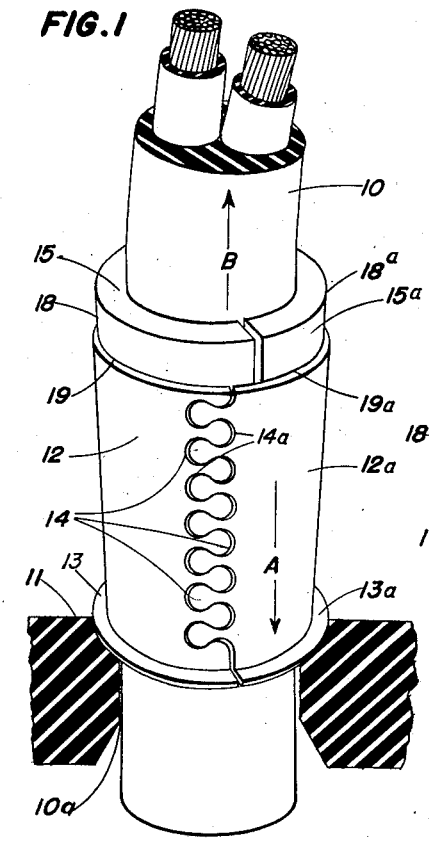
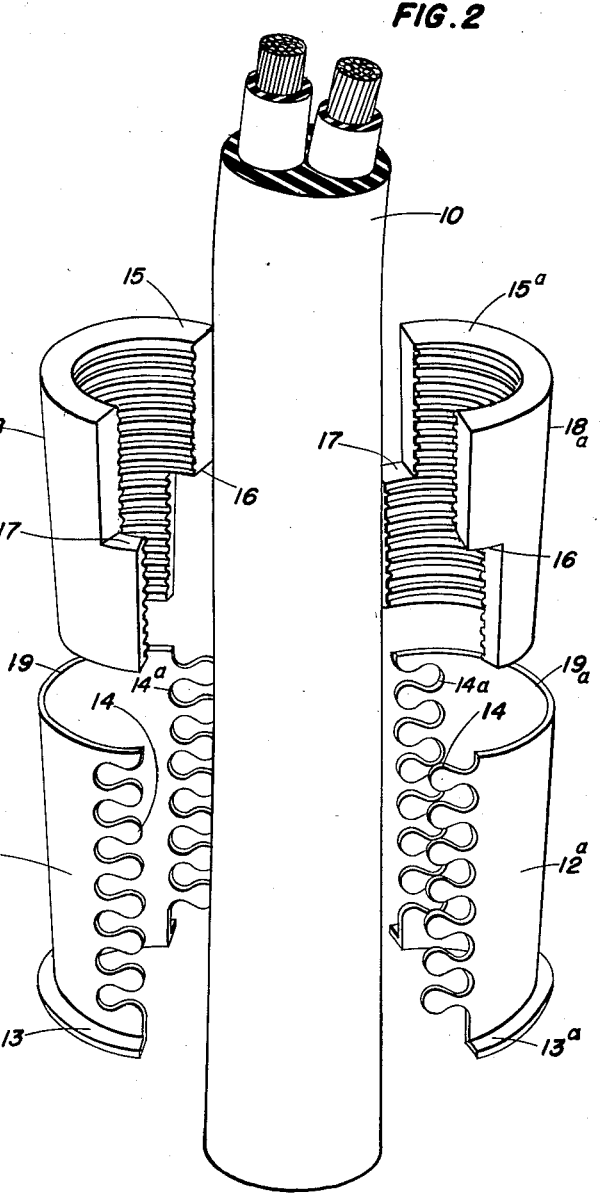
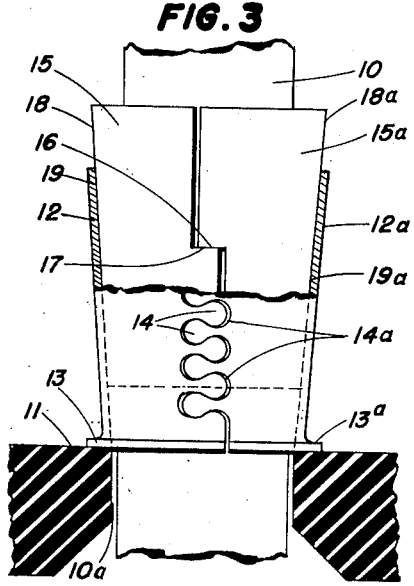
INVENTORS
JAMES A. S. ROY
DANIEL E. SCHWARTZ.
BY    *S. D. O'Brien*
ATTORNEY Patented Jan. 16, 1951

2,538,043

UNITED STATES PATENT OFFICE 2,538,043

SUPPORT

James A. S. Roy, Herndon, Va., and Daniel E. Schwartz, Washington, D. C.

Application February 21, 1946, Serial No. 649,436

3 Claims. (Cl. 24—114.5)

(Granted under the act of March 3, 1883, as amended April 30, 1928; 370 O. G. 757)

This invention relates to a support and more particularly to a strain-relieving support for use with cables and the like.

One object of the invention is to provide a support for cables and the like which is adapted to be assembled upon or removed from a cable or the like insitu without necessitating having one end of the cable free to pass through the support.

Another object of the invention is to provide a support for a cable or the like adapted to grasp the cable or the like more tightly as the strain on the cable increases.

Another object of the invention is to provide a support which permits rotation of the cable or the like.

A further object of the invention is to provide an improved support which electrically insulates an electric cable from the surrounding structure.

Another object of the invention is to provide a cable support for use with a cable passing through a brace in which the elements comprising the support need be manipulated only from one side of the brace.

These and other objects of the invention will be apparent from the accompanying drawings and the following specification, in which:

Fig. 1 is a perspective view of the cable support applied to a brace which is shown in section;

Fig. 2 is an exploded perspective view of the cable support; and

Fig. 3 is an elevational view, partly in section, of the cable support in use.

It should be understood that the word "cable" as used herein includes ropes, steel cables, and the like and is not limited to electric cables.

In the preferred embodiment of the invention as shown in the drawings, the device serves to support and relieve the strain on a remotely ended cable 10 passing through an opening 10a in a brace 11. The support comprises a pair of tapered semi-frustoconical shell members 12, 12a preferably of metal, the respective ones of which have an out-turned flange 13, 13a at their lower ends. The two shell members 12, 12a have interlocking tongue and socket portions 14, 14a which because of the type of curvation shown, form an inherent interlock when engaged, preventing radial separation of the shell members under the expansive force of the cable-grasping elements mentioned below, and permitting separation only by relative motion in a plane normal to the axis of the frustroconical section formed by the members 12, 12a in the absence of said elements. The collective flanges 13, 13a cooperate with the brace 11 to maintain the support on the brace and at the same time reduce the unit bearing pressure and consequently any incidental wear in the brace. Thus said flange constitutes a footing, an additional function of which is to serve as a rest on which the operator can apply his weight through his feet and aid in the removal of the cable-grasping elements 15, 15a from the shell.

Said cable grasping elements 15, 15a which are semi-cylindrical in cross-section and exteriorly tapered, fit within the shell formed by the members 12, 12a and are adapted to be retained thereby at a place on the cable located medially of the aforesaid remote ends. The cable grasping elements 15, 15a have projecting and mutually engaging shoulders 16, 17 which, when engaged, provide locating means which prevent relative longitudinal movement of the members 15, 15a. The members 15, 15a may be of insulating material when used for electrical cables and preferably have interior friction-increasing projections or lands and grooves to provide a better grasp on the cable 10. When used for steel cables and the like members 15, 15a may be of any suitable material.

In use, with the cable 10 passing through the opening 10a in the brace 11, the disassembled shell members 12, 12a are placed on opposite sides of the cable 10 and are then interlocked by sliding the tongue and socket portions into engagement, after which the shell is moved (in the direction indicated by the arrow A) on the cable 10 into contact with the brace 11. It is observed that the tongue and socket portions 14, 14a, in the form shown, consist of a sinuous edging wherein the alternating heads and sockets are the same in size and the tongues of the heads and the inlets of the sockets are narrower than either the heads or sockets. These parts are struck normal to the members 12, 12a so that if and when the members are stood on the brace 11 slightly offset laterally from each other, the sinuous edging will exactly match for interfitting when said members are shifted laterally to complete the shell. The two cable grasping elements 15, 15a are then placed on opposite sides of the cable 10 above the shell 12, 12a and are moved toward each other into engagement, after which the two members 15, 15a are pushed (in the direction A) along the cable until they enter the shell. After the tapered outer surface formed by the cable-engaging members 15, 15a contacts the complementary tapered inner surface of the shell, further telescopic movement by way of insertion of the cable-engaging members into the shell members serves to force the cable-engaging members more closely together and to cause them to grasp the cable more tightly. After the support is thus assembled, a pull (in the direction A) on the cable 10 is transmitted to the cable-engaging members 15, 15a which transmit the strain to the shell formed by members 12, 12a which, in turn, bears against the brace 11, and thus prevents movement of the cable 10 (in the direction A). An important feature of the invention is the fact that increased pull on the cable only causes the cable-grasping members to tighten on the cable and more firmly to resist slipping of the cable therethrough. Additionally, such increased pull does not deform the cable in an undesired manner, because the compression on the cable is distributed over the interior surfaces of elements 15, 15a in a substantially uniform manner.

The projections 16 and 17 on element 15 are so arranged that projection 16 of one element engages projection 17 of the other element when the grasping elements 15, 15a are placed on opposite sides of a cable or the like. The engagement of projections 16 with projections 17 prevents relative axial motion of one element 15 with respect to the other element 15a when elements 15, 15a are assembled as a pair.

A strain produced axially on the cable 10 in a direction which would tend to further engage the outer tapered surfaces of elements 15, 15a with the inner tapered surfaces of elements 12, 12a will produce a force in the same axial direction on the elements 15, 15a. The surfaces 18, 18a of the elements 15, 15a in turn exert a force normal to surfaces 19, 19a of elements 12, 12a placing the elements 12, 12a in greater tension. The elements 12, 12a therefore, exert a force equal in magnitude but opposite in direction upon the elements 15, 15a. The angle of taper of the engaging surfaces 18, 18a and 19, 19a is so chosen as to provide a friction lock which normally resists disengagement of elements 12, 12a and 15, 15a. Motion of the cable 10 in an axial direction "B" will therefore carry elements 12, 12a and 15, 15a with cable 10 with no relative motion occurring between cable 10 and elements 12, 12a and elements 15, 15a.

Disassembly of elements 12, 12a and 15, 15a from cable 10 is obtained by applying sufficient force in one direction to cable 10 and an opposite force on flanges 13, 13a as hereinbefore explained, so as to overcome the frictional forces between tapered surfaces 18, 18a and 19, 19a thus permitting the withdrawal of elements 15, 15a from elements 12, 12a and ultimate complete disengagement and disassembly.

Elements 15, 15a are identical and can be made in the same mold, or by the same pattern or die. Elements 12, 12a are also identical and can be made in the same mold, or by the same pattern or die.

It will be understood that the brace 11 is not a part of this invention.

The assembly procedure may be reversed by axially moving the cable-grasping members 15 (in a direction indicated by the arrow B) out of tight engagement with the shell. After the members 15 are withdrawn from the shell they are separated and removed from the cable. Thereafter, the shell members may be separated, an operation which was impossible while the support was assembled due to the fact that the presence of the cable-grasping members wedged within the shell prevented the relative transverse movement of the shell members 12 necessary for their disengagement from each other. When the cable-grasping members 15 are removed from within the shell, the shell members 12 are readily separated by a slight relative transverse movement.

We have described a preferred embodiment of the invention and it is to be understood that various modifications and variations of the invention may be made without departing from the true scope of the invention as defined by the appended claims.

The invention herein described may be manufactured and used by or for the Government of the United States of America for governmental purposes without the payment of any royalties thereon or therefor.

We claim:

1. A support for sustaining a cable which occupies an opening through a brace, said support comprising a tubular tapered shell oversized in comparison to the cable and diametrically larger than the cable even at its narrow end, said shell consisting of identically formed members with sinuous confronting edges consisting of an alternation of tongues with heads and sockets with inlets all struck normal to said members, the tongues and inlets being narrower than the heads and sockets to compose an interlock, said heads and sockets registering when the members are slightly offset by utilization of said oversize around the cable, then subject solely to a relative lateral motion thereby interlocking the heads and sockets to compose the shell, and a set of cable grips fitting in the shell, exercising a radially outward force on the members, and diverse pulls on the tongues and heads to maintain the shell in unitary form.

2. A support for sustaining a cable which occupies an opening through a brace, said support comprising a tubular tapered shell oversized in comparison to the cable and diametrically larger than the cable even at its narrow end, said shell consisting of a plurality of segments connected at their conjoint edges by a system of interdigitated terminally enlarged and consequently interlocked tongues lying within the surfaces of the shell, and a second shell formed longitudinally in sectional parts and fitting within the tubular tapered shell to maintain the tongues in interlocked engagement.

3. A support for sustaining a cable which occupies an opening through a brace, said support comprising a tubular tapered shell oversized in comparison to the cable and diametrically larger than the cable even at its narrow end, said shell consisting of a plurality of segments connected at their conjoint edges by a system of uniformly configurated interdigitated tongues enlarged at their terminals hence mutually interlocked and lying within the surfaces of the shell, and a second shell formed longitudinally in sectional parts fitting both the cable and the internal contour of the tubular tapered shell to maintain the tongues in interlocked engagement.

JAMES A. S. ROY.
DANIEL E. SCHWARTZ.

REFERENCES CITED

The following references are of record in the file of this patent:

UNITED STATES PATENTS

| Number | Name | Date |
|---|---|---|
| 476,196 | Hamilton | May 31, 1892 |
| 680,481 | Furman | Aug. 13, 1901 |
| 801,707 | Becker et al. | Oct. 10, 1905 |
| 1,080,472 | Parker et al. | Dec. 2, 1913 |
| 1,256,666 | Douglas | Feb. 18, 1918 |
| 1,853,681 | Hayes | Apr. 12, 1932 |
| 1,862,886 | Dublin | June 14, 1932 |
| 1,880,356 | Noble | Oct. 4, 1932 |

FOREIGN PATENTS

| Number | Country | Date |
|---|---|---|
| 354,335 | Great Britain | Aug. 10, 1931 |
| 405,524 | Germany | Nov. 4, 1924 |
| 482,984 | Great Britain | Apr. 8, 1938 |